(12) United States Patent
Civanlar et al.

(10) Patent No.: US 11,949,451 B2
(45) Date of Patent: Apr. 2, 2024

(54) OPTICAL DATA TRANSMISSION SYSTEM FOR SWIMMERS

(71) Applicant: OZYEGIN UNIVERSITESI, Istanbul (TR)

(72) Inventors: Mehmet Reha Civanlar, Istanbul (TR); Murat Uysal, Istanbul (TR)

(73) Assignee: OZYEGIN UNIVERSITESI, Istanbul (TR)

( * ) Notice: Subject to any disclaimer, the term of this patent is extended or adjusted under 35 U.S.C. 154(b) by 254 days.

(21) Appl. No.: 17/601,438

(22) PCT Filed: Apr. 5, 2019

(86) PCT No.: PCT/TR2019/050224
§ 371 (c)(1),
(2) Date: Oct. 5, 2021

(87) PCT Pub. No.: WO2020/204849
PCT Pub. Date: Oct. 8, 2020

(65) Prior Publication Data
US 2022/0166509 A1    May 26, 2022

(51) Int. Cl.
*H04B 10/116*    (2013.01)
*H04B 13/02*    (2006.01)

(52) U.S. Cl.
CPC .......... *H04B 10/116* (2013.01); *H04B 13/02* (2013.01)

(58) Field of Classification Search
CPC .............................. H04B 10/116; H04B 13/02
USPC .......................................................... 398/104
See application file for complete search history.

(56) References Cited

U.S. PATENT DOCUMENTS

| | | | | |
|---|---|---|---|---|
| 4,382,266 A * | 5/1983 | Panzer | ............... | H04N 7/17345 725/144 |
| 5,267,070 A * | 11/1993 | Stewart | .................. | H04B 13/02 398/189 |
| 6,704,500 B2 * | 3/2004 | Takematsu | ............. | G03B 15/05 396/267 |
| 10,187,171 B2 * | 1/2019 | Doster | .................... | G06N 3/084 |
| 2005/0232638 A1 * | 10/2005 | Fucile | .................... | H04B 13/02 398/140 |

(Continued)

FOREIGN PATENT DOCUMENTS

| | | |
|---|---|---|
| CN | 202759453 U | 2/2013 |
| JP | H1056426 A * | 2/1998 |

(Continued)

OTHER PUBLICATIONS

Zhaoquan Zeng, et al., A Survey of Underwater Optical Wireless Communications, IEEE Communications Surveys & Tutorials, 2017, pp. 204-238, vol. 19, No. 1.

(Continued)

*Primary Examiner* — Abbas H Alagheband
(74) *Attorney, Agent, or Firm* — Bayramoglu Law Offices LLC

(57) ABSTRACT

An underwater communication system, wherein the underwater communication system is capable of increasing a data transmission through a visible light between a surface and underwater of a swimming pool and an underwater communication method providing the data transmission between the surface and the underwater of the swimming pool are provided.

9 Claims, 2 Drawing Sheets

(56) References Cited

U.S. PATENT DOCUMENTS

| | | | | |
|---|---|---|---|---|
| 2006/0286931 A1* | 12/2006 | Rhodes | ............... | H04B 13/02 |
| | | | | 455/40 |
| 2009/0208219 A1* | 8/2009 | Rhodes | ............... | H04B 13/02 |
| | | | | 398/115 |
| 2010/0040375 A1* | 2/2010 | Sexton | ............... | H04B 10/00 |
| | | | | 398/104 |
| 2014/0051352 A1* | 2/2014 | Wolfe | ............... | H04B 13/02 |
| | | | | 455/40 |
| 2014/0308042 A1* | 10/2014 | Woo | ............... | H04B 10/2575 |
| | | | | 398/104 |
| 2016/0121009 A1* | 5/2016 | Farr | ............... | H04B 10/80 |
| | | | | 250/492.1 |
| 2018/0062766 A1* | 3/2018 | Ooi | ............... | H04B 10/807 |
| 2018/0234190 A1 | 8/2018 | Rauhala | | |

FOREIGN PATENT DOCUMENTS

| | | | |
|---|---|---|---|
| KR | 20170000515 A * | 1/2017 | |
| WO | 2018002702 A1 | 1/2018 | |
| WO | WO-2018002702 A1 * | 1/2018 | ........... H04B 10/116 |

OTHER PUBLICATIONS

Mohammad Vahid Jamali, et al., MIMO Underwater Visible Light Communications: Comprehensive Channel Study, Performance Analysis, and Multiple-Symbol Detection, 2017, pp. 1-15.

Arsyad Ramadhan Darlis, et al., Bidirectional Underwater Visible Light Communication, 2018, pp. 5203-5014, vol. 8, No. 6.

Marek Doniec, et al., Robust Real-Time Underwater Digital Video Streaming using Optical Communication, 2013 EEE International Conference on Robotic and Automation (ICRA), 2013, pp. 5117-5124.

* cited by examiner

OPTICAL DATA TRANSMISSION SYSTEM FOR SWIMMERS

CROSS REFERENCE TO THE RELATED APPLICATIONS

This application is the national stage entry of International Application No. PCT/TR2019/050224, filed on Apr. 5, 2019, the entire contents of which are incorporated herein by reference.

TECHNICAL FIELD

The present invention relates to an underwater communication system capable of increasing data transmission through the visible light between the surface and underwater of the swimming pool and an underwater communication method providing data transmission between the surface and underwater of the swimming pool.

BACKGROUND

An extremely useful device for people doing water/underwater sports, for example swimmers is waterproof headphones. These devices can take the form of small ear-insertable "ear buds" or headphones having left and right speakers with a flexible cover to fit over the wearer's ears. Waterproof headphones conventionally receive audio signals from an audio or media player device carried by the swimmer via a small wire.

There are audio systems with waterproof headphones and players which can work in an aquatic environment. These known systems play only stored data. Since water is not a suitable medium for radio transmission and a swimmer who is underwater is unreachable via RF transmission, sending data through conventional methods do not work. Wireless RF signals, such as Bluetooth, Wi-Fi, cellular, either do not penetrate the water or do not travel or propagate in water for the desired transmission ranges. Also, underwater acoustic signaling (restricted to data rates of a few tens of kilobits per second) cannot handle data streaming with large enough bandwidth (such as those needed for high quality music streaming). Consequently, such systems cannot be connected to a remote data source.

Another problem encountered in the prior art is the lack of a system to provide direct communication between a swimmer and an instructor. Currently the only way for the swimming instructor to communicate with the swimmer is by means of shouting which can get noisy and may not be heard by the target swimmer.

In the prior art there are Bluetooth headphones that have become available in the waterproof headphones market nowadays. These devices feature full-fledged Bluetooth connectivity, waterproof structure, and dedicated buttons for volume, skipping tracks and taking call. But it should be noted that Bluetooth signals and water don't play well together. The Bluetooth signal dissipates if the two connected devices are more than a couple of centimeters apart. Therefore, the swimmer must carry the audio source on her and remote transmission is not possible.

Chinese Utility Model Application CN202759453 relates to a same frequency double way video, audio and data transmission system applied to underwater condition. The transmission system comprises a router, a transmitting channel, an electro acoustic converter, a receiving channel and a controller. The transmitting channel is used for converting an intermediate frequency signal output by the modem into a radio frequency signal and for sending the radio frequency signal to an electro acoustic converter. The electro acoustic converter is used for carrying out conversion between the radio frequency signal and an audio signal and for carrying out output. The receiving channel is used for converting the radio frequency signal output by the electro acoustic converter into the intermediate frequency signal and for sending the intermediate frequency signal to the modem. In this model, the use of acoustic signals restricts the available bandwidth to the system.

US patent application US20180234190 discloses wireless audio streaming to an underwater user based on radio transmission. Such a system has some problems because of the very limited propagation of radio waves in the water or the required bulky transceivers to extend transmission ranges.

US patent application US20140308042 discloses visible light communication used between two underwater users. This application does not address the need for surface to underwater communications.

There is still a need in the art for a data transmission system to solve the problems of broadcasting data from surface to underwater wherein a sufficient bandwidth for multi channel audio transmission and reliable connection can be established.

SUMMARY

The main object of the present invention is to provide an underwater communication system through visible light capable of increasing data transmission speed and being implemented at a low cost by being configured to perform communication under water through a visible light source which can take the form of light emitting diode (LED) or laser diode with proper diffusers, and an underwater communication method using the same.

Another object of the present invention is to provide an instant, efficient and faster data transmission between the underwater and the surface.

Another object of the present invention is to provide a direct communication between the person in the water, for example a swimmer and the person outside, for example a coach with the communication system of the present invention. Thereby the coach can instruct the swimmer directly through swimmer's headphones.

The present invention further provides a data transmission system through visible light for providing the data transmission between the surface and the underwater in a swimming pool. The data transmission system comprises at least one digital audio source configured to transfer an audio signal from the stored data or stream data, at least one modulator configured to receive the audio signal from the audio source and convert it into electrical signal, at least one light source configured to receive the electrical signal from the modulator and convert it into optical signal, at least one light sensor configured to receive the optical signals from the light source and convert the aggregated optical signal into electrical signal, at least one demodulator providing a baseband processing of multiple received electrical signals to retrieve the data signal, at least one audio converter configured to convert the data signal into an audio signal and at least one output unit configured to play back the audio signals generated by the audio converter.

The digital audio source (10) is a sound sensor or a microphone followed by an analogue to digital audio signal converter.

The modulator of the present invention comprises electronic circuits configured to convert the digital data into an electrical waveform that can be applied to a light source. The data transmission system of the present invention comprises at least one light source configured to be placed at the ceiling and/or surrounding wall of the indoor swimming pool. The data transmission system further comprises one or more light sources configured to be placed at the sides and/or bottom of the swimming pool at a certain distance to each other. The light source comprises light emitting diodes.

The data transmission system according of the present invention comprises the light sensor configured to be clipped to a belt, or worn on an armband or positioned on a swimsuit or swimmers' goggles.

The data transmission system further comprises multiple light sources and multiple light sensors configured to provide multiple input and multiple output communication (MIMO) between the light sources and light sensors.

The output unit comprises waterproof headsets.

The data transmission system further comprises a channel selector configured to select the received signal transferred from the audio source and correspond to a channel chosen by the user.

The present invention provides a use of data transmission system through visible light for providing the data transmission between the surface and the underwater at the swimming pools. The data transmission system comprises at least one digital audio source configured to transfer an audio signal from the stored data or stream data, at least one modulator configured to receive the audio signal from the audio source and convert it into electrical signal, at least one light source configured to receive the electrical signal from the modulator and convert it into optical signal, at least one light sensor configured to receive the optical signals from the light source and convert the aggregated optical signal into electrical signal, at least one demodulator providing a baseband processing of multiple received electrical signals to retrieve the data signal, at least one audio converter configured to convert the data signal into an audio signal and at least one output unit configured to play back the audio signals generated by the audio converter.

The present invention also provides an optical data transmission method comprising the following steps:
modulating the digital audio signal to be transmitted to the swimmer and feeding the digital audio signal to multiple light sources,
converting the electrical signal received from each light source into optical signal,
propagating the optical signals emitted from light sources through water and transmitting the optical signal to the swimmer,
collecting the aggregated optical signals by each light sensor and converting it into an electrical signal,
demodulating the electrical signal either from the selected sensor or combine output and retrieving the data signal, and
playing back the audio signal by an output unit.

DETAILED DESCRIPTION OF THE EMBODIMENTS

Figure 1:
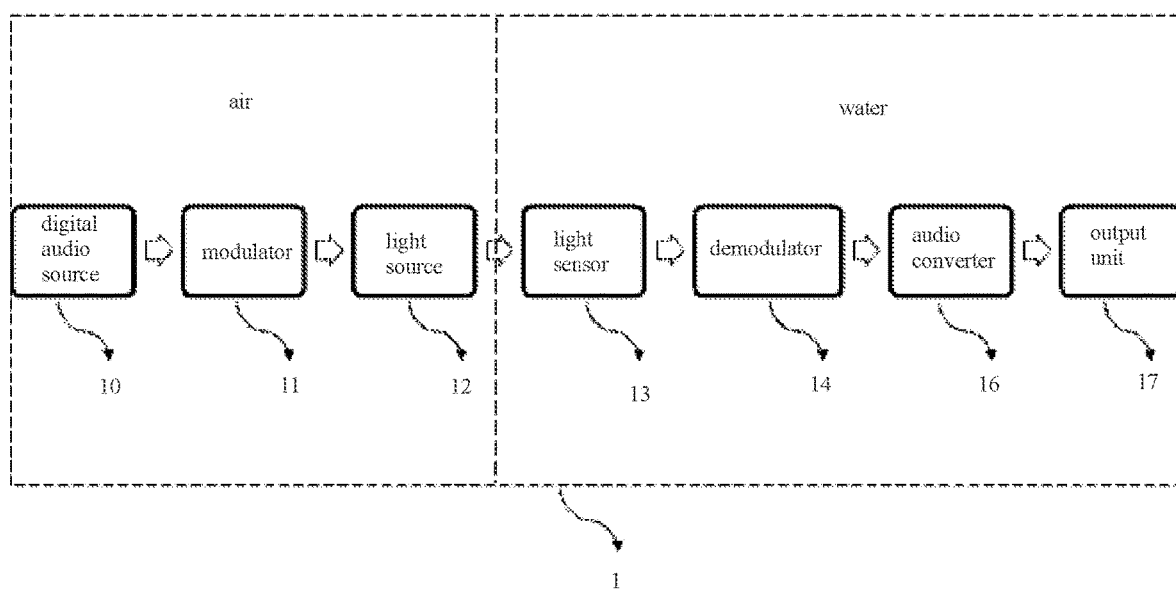
FIG. 1 Flow chart of the data transmission system without channel selector.
Figure 2:
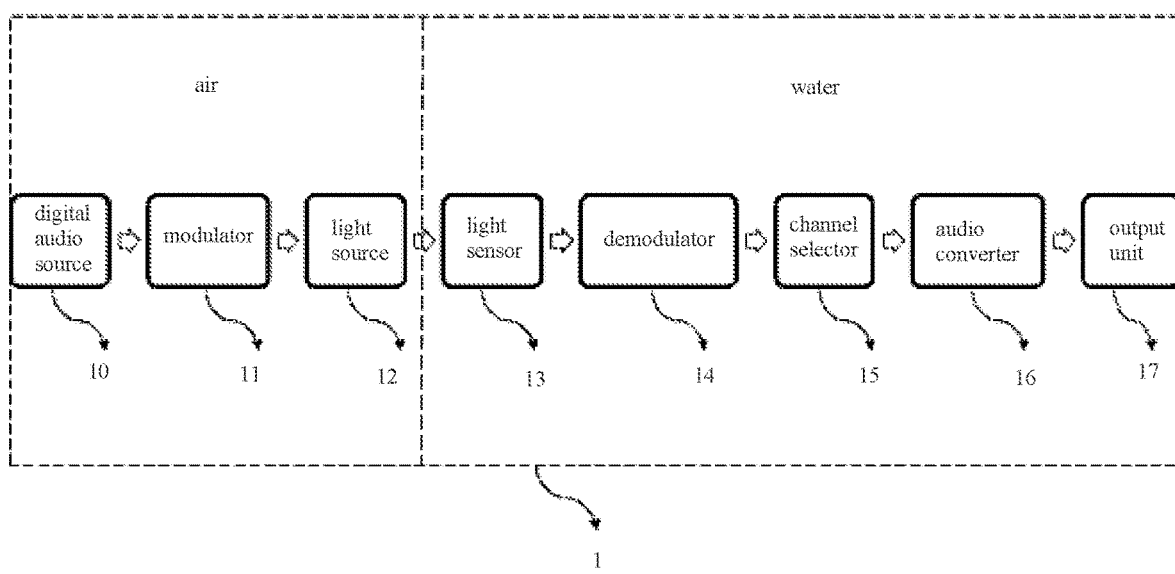
FIG. 2 Flow chart of the data transmission system with channel selector.
1. Data transmission system
10. Digital audio source
11. Modulator
12. Light sources
13. Light sensors
14. Demodulator
15. Channel selector
16. Audio converter
17. Output unit

The present invention provides a method and a system for data transmission between the underwater and the surface of a swimming pool.

A data transmission system (1) for use in a swimming pool to provide data transmission through visible light between the surface and the underwater, comprises at least one digital audio source (10) transferring an audio signal from the stored data or stream data, at least one modulator (11) converting the audio signal to electrical signal, at least one light source (12) converting the electrical signal into optical signal, at least one light sensor (13) receiving the optical signals from the light source (12) and converting received and aggregated optical signal into electrical signal, at least one demodulator (14) providing a baseband processing of multiple received electrical signals to retrieve the data signal, at least one audio converter (16) converting the data signal into an audio signal and at least one output unit (17) playing back audio signals generated by the audio converter (16). (References: (1) M. Uysal, C. Capsoni, Z. Ghassemlooy, A. C. Boucouvalas, E. G. Udvaiy (Eds.), Optical Wireless Communications—An Emerging Technology, Springer 2016, (2) S. Dimitrov and H. Haas, Principles of LED Light Communications: Towards Networked Li-Fi", Cambridge University Press 2015, (3) Z. Zeng, S. Fu, H. Zhang, Y. Dong and J. Cheng, A Survey of Underwater Optical Wireless Communications," IEEE Communications Surveys & Tutorials, 2017).

In one embodiment of the present invention, the digital audio source (10) may include stored digital audio signals such as stored music, stored podcasts and audio books and/or a stream data in real time such as music, radio channels, several program channels and media streaming applications or the speech or instructions of the coach who is on the surface. In one embodiment of the present invention, modulator (11) receives an audio signal transferred from the digital audio source (10) and converts the audio signal into an electrical signal. Modulator (11) has electronic circuits converting digital data into an electrical waveform that can be applied to a light source (12).

In one embodiment of the present invention sound sensors or microphone are used as the audio signal source followed by an analogue to digital (A/D) audio signal converter whose output is applied to the modulator (11).

In one embodiment of the present invention there are several program channels and some of them are reserved for coach and swimmer communication in real time. When coach gives instructions to the swimmer, voice of the coach is converted to digital form by microphones and data to be forwarded to the swimmer is sent through the selected channel.

In another embodiment of the present invention information appliance used by the coach runs a specially configured media streaming application. This application is used by a coach in real-time as the swimmer is performing the activity. One of the functions of the application is to provide the coach with the ability to select an individual swimmer to communicate with, and then to translate his/her voice to digital form and send the data to be forwarded to the particular swimmer.

In one embodiment of the present invention, the wireless transmission capabilities can include optical transmission. The light source (12) serves as a wireless transmitter. The light source (12) receives the electrical signals from modulator (11) and converts into optical signals.

The light source (12) is configured to receive the electrical signal from the modulator (11) and to adjust intensity of the optical illumination signal. Subsequently, the light source (12) receives electrical signal and illumination signal and gathering these two signals to generate a complex light signal. After that it adjusts a wavelength of the complex light signal to emit a visible light signal to underwater.

In one embodiment of the present invention; data transmission system (1) provides optical data transmission between the swimmer in the swimming pool and the surface. Swimming pool is an indoor swimming pool. According to one embodiment of the present invention, at least one light source (12) is placed at the ceiling of the indoor swimming pool.

The light sources (12) are already placed at the sides and/or bottom of the swimming pool at a certain distance to each other and in one embodiment of the present invention the light sources (12) can be configured to used for data transmission between the surface and the underwater of the swimming pool. In one embodiment of the present
   invention, the data transmission system (1) is configured to include at least one light sensor (13).

The light sensor (13) is configured to receive and amplify the visible light signal emitted from the light source (12) to the underwater. The received and amplified visible light signal is converted into an electrical signal so that the visible light signal may be easily output.

The light sensor (13) is preferably provided on the swimmer. The light sensor (13) can be clipped to a belt, or worn on an armband or on a swimsuit or swimmers' goggles. Thus, optical signals emitted from the light sources (12) propagate through water and reach to the swimmer.

Each light sensor (13) receives the light signals from multiple light sources (12) and converts the aggregated optical signal into electrical signal.

In one preferred embodiment of the present invention multiple light sources (12) and multiple light sensors (13) on the same swimmer are used to enable robust performance in the presence of shadowing or blockage due to swimmer movements. In the present invention, MIMO (M. V. Jamali; P. Nabavi; J. A. Salehi, "MIMO Underwater Visible Light Communications: Comprehensive Channel Study, Performance Analysis, and Multiple-Symbol Detection", 2018) communication makes data transmission possible even if one or more light sensors are completely blocked by swimmer arm. The MIMO technology is originally developed for RF transmission between multiple transmission and reception antenna. In this application, the multiple light sources and multiple light sensors are being used instead of antennas as explained in M. V. Jamali; P. Nabavi; J. A. Salehi, "MIMO Underwater Visible Light Communications: Comprehensive Channel Study, Performance Analysis, and Multiple-Symbol Detection", 2018.

In one embodiment of the present invention, demodulator (14) provides a baseband processing of multiple received electrical signals from the light sensors (13) to retrieve the data signal. In the present invention, the output of light sensors (13) can be processed in two different ways;

The light sensor (13) with highest signal to noise ratio is selected or

The outputs can be combined through maximal ratio combining where the signals from each receiver are multiplied with proper weighting coefficients based on the available channel state information and a weighted sum is obtained.

The electrical signal either from the selected sensor or combiner output is demodulated by demodulator (14) and data signal is retrieved.

The audio converter (16) converts the received data signal into an audio signal and the output unit (17) plays back audio signals generated by the audio converter (16).

In one embodiment of the present invention, data transmission system comprises an output unit or device playing back the audio signal. The output unit may be waterproof headsets such as headphones. The output unit (17) may also be any device found in the prior art capable of outputting various signals.

In one embodiment of the present invention, the data transmission system further comprises a channel selector (15). In that case the audio source (10) includes stream data signal that can be selected by the swimmer in real time such as music, radio channels, several program channels and media streaming application. "Channel" is chosen by the swimmer, and thus, the received signal corresponds to channel chosen by the swimmer. In these circumstances the channel selector (15) selects the received signal transferred from the audio source (10) and correspond to a channel chosen by the swimmer. The audio converter (16) converts the selected signal into an audio signal and the output unit (17) plays back audio signals generated by the audio converter (16).

The present invention further provides an optical data transmission method (100) comprising the following steps:
   modulating the digital audio signal to be transmitted to the swimmer and feeding the digital audio signal to multiple light sources (12),
   converting the electrical signal received from each light source (12) into optical signal,
   propagating the optical signals emitted from light sources (12) through water and transmitting the optical signal to the swimmer,
   collecting the aggregated optical signals by each light sensor (13) and converting it into an electrical signal,
   demodulating the electrical signal either from the selected sensor or combine output and retrieving the data signal, and
   playing back the audio signal by an output unit (17).

What is claimed is:
1. A data transmission system through a visible light for providing a data transmission between a surface and an underwater of a swimming pool, wherein the data transmission system comprises:
   at least one digital audio source configured to obtain a first audio signal from stored data or stream data,
   at least one modulator configured to receive the first audio signal from the at least one digital audio source and convert the received first audio signal into a first electrical signal,
   at least one light source configured to receive the first electrical signal from the at least one modulator and the at least one light source is configured to convert the electric signal into an optical signal and transmit the optical signal, wherein the at least one light source is placed on a ceiling of an indoor swimming pool, at least one light sensor configured to receive underwater the optical signal transmitted from the at least one light source and convert the received optical signal into a second electrical signal, at least one demodulator configured receive the second electrical signal and retrieve a data signal from a baseband processing of the received second electrical signal, at least one audio converter configured to convert the data signal into a second audio signal, and at least one output unit configured to play the second audio signal generated by the at least one audio converter.

2. The data transmission system according to claim 1, wherein the at least one modulator comprises electronic circuits configured to convert digital data into an electrical waveform applied to the at least one light source.

3. The data transmission system according to claim 2, wherein the at least one digital audio source is a sound sensor or a microphone followed by an analogue to digital audio signal converter.

4. The data transmission system according to claim 1, wherein the at least one light source comprises one or more light emitting diode.

5. The data transmission system according to claim 1, wherein the at least one light sensor is configured to be clipped to a belt, worn on an armband, or positioned on a swimsuit or goggles of a person under water.

6. The data transmission system according to claim 1, wherein the at least one light source comprises a plurality of light sources and the at least one light sensor comprises a plurality of light sensors, and the plurality of light sources and the plurality of light sensors are configured to provide multiple input and multiple output communication (MIMO) between the plurality of light sources and the plurality of light sensors.

7. The data transmission system according to claim 1, wherein the at least one output unit comprises a waterproof headset.

8. The data transmission system according to claim 1, further comprising a channel selector configured to select a received signal transferred from a plurality of digital audio sources according to a channel chosen by a user.

9. An optical data transmission method performed by the data transmission system according to claim 1, comprising:
modulating the first audio signal to be transmitted to a swimmer and transmitting the first audio signal to the at least one light source,
converting the first electrical signal received from the at least one light source into the optical signal,
propagating the optical signals transmitted from the at least one light source through water and transmitting the optical signals to the at least one light sensor of the swimmer,
collecting aggregated optical signals by the at least one light sensor and converting the aggregated optical signals into the second electrical signal,
demodulating the second electrical signal received from the at least one light sensor to retrieve the data signal,
converting the data signal into the second audio signal, and
playing the second audio signal by an output unit.

* * * * *